United States Patent Office 3,078,066
Patented Feb. 19, 1963

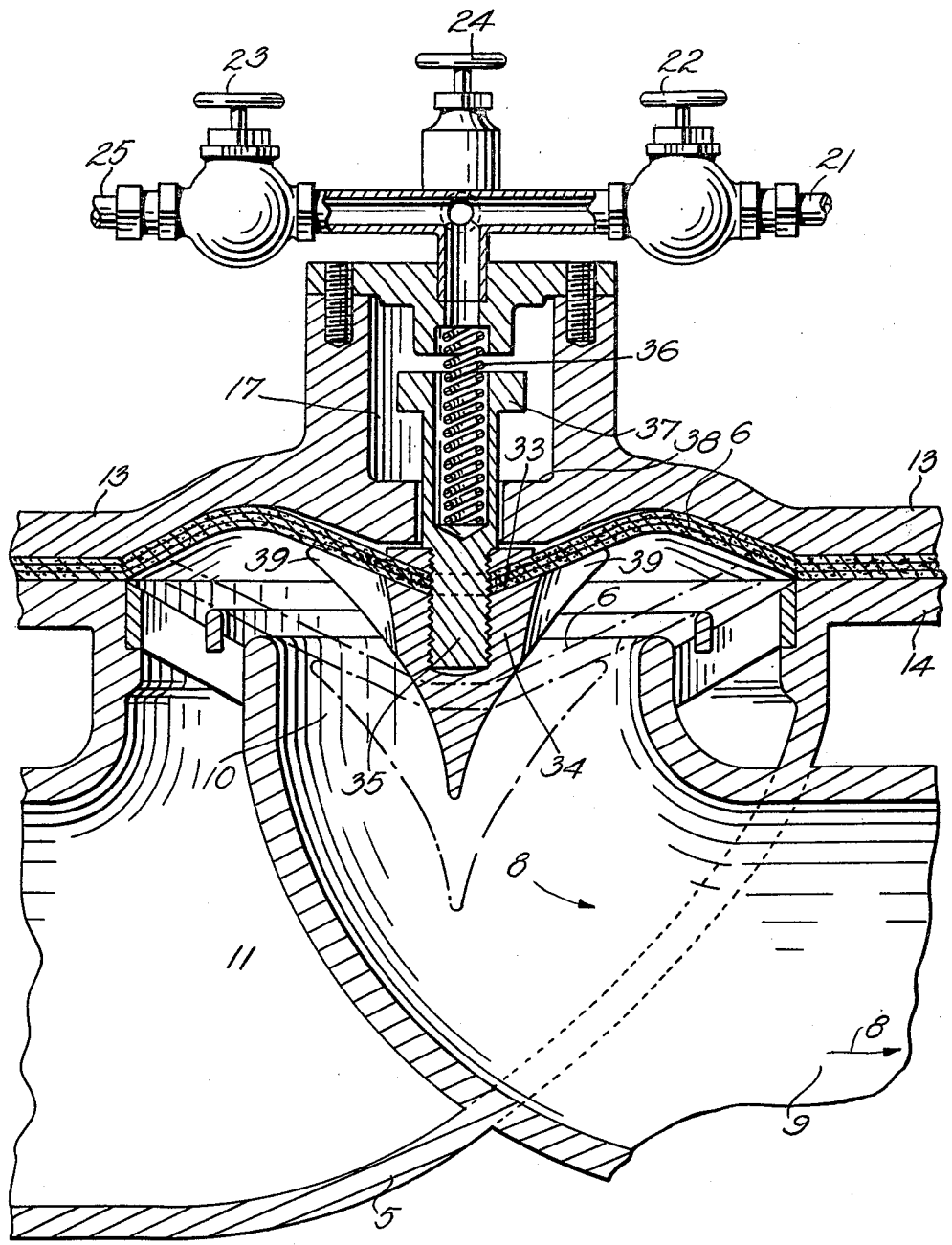

3,078,066
DIAPHRAGM VALVES
Richard P. Moore, Argosy House, Spilsbury St., Germiston, Transvaal, Republic of South Africa
Filed Sept. 16, 1958, Ser. No. 761,431
Claims priority, application Republic of South Africa Sept. 20, 1957
2 Claims. (Cl. 251—61)

This invention relates to pressure-operated diaphragm valves.

In all diaphragm valves known to the inventor the diaphragm undergoes a degree of stretching when moving between the open and closed positions. Two drawbacks arise from this feature, the first of which is the ease with which the diaphragm is inclined to disintegrate due to the stretching action to which it is subjected. The second drawback is the difficulty of providing an adequate reinforcement for the diaphragm in view of the circumstances.

An object of the present invention is to minimize the drawbacks outlined above.

A further object of the invention is to provide a diaphragm valve capable of operating in pipe lines carrying high pressures.

Yet another object is to provide a valve of the kind in question in which the operation of the diaphragm is accomplished with the aid of the pressure fluid passing in a pipe line incorporating the valve.

Another object of the invention is to provide an arrangement wherein the aperture through the valve is opened gently rather than abruptly.

According to the present invention a pressure operated valve includes a flexible diaphragm, dividing the valve into two compartments, one compartment being connected to a source of pressure fluid and a second compartment including concentric inlet and outlet passages, the diaphragm obturating the passages when the pressure in the first compartment exceeds the pressure in the concentric passages, and being connected to a column slidable within the first compartment, and having a tapered vaned member on its lower side fitting into the inner concentric passage when the diaphragm obturates the concentric passages.

Spring means may be provided to bias the diaphragm into its closed position. Further passages may be provided so that the pressure of the fluid in a pipe-line incorporating the valve may be utilized in operating the diaphragm.

To illustrate the invention an example is described hereunder with reference to the accompanying drawing which is a section of one form of valve according to the invention.

In the FIGURE, 5 is the valve casing, and 6 is the diaphragm. The diaphragm is shown in its open position so that pressure fluid may pass in the direction of the arrows 8 from the upstream side 9 through the passage 10 which is concentric with passage 11 forming the outlet. Of course, the direction of flow may well be reversed.

The diaphragm 6 divides the valve into two compartments, one below it comprising the concentric inlet and outlet passages 10, 11 and an upper compartment bounded by the cover 13, which may also be termed the "diaphragm-operating compartment casing."

The diaphragm 6 is held between cover 13 and flange 14, and is flexible so that it is wrinkled in its open position and sags in its closed position without stretching.

The centre of the diaphragm is nipped between nut elements 33 and 34, threaded on to a bolt member 35. Nut element 34 constitutes the tapered vaned member of the invention, the vanes being indicated by reference 39.

In its closed position, as shown in chain line, the member 34 fits into the inner concentric orifice 10, the stop 37 on the extension of bolt member 35 abutting against shoulder 38 of the cover 13. This extension of the bolt member 35 is the movable column of the invention.

A spring 36 may be provided to bias the diaphragm to its closed position, but the spring is not an essential part of the invention.

It will be noted that the nut member 34 (or tapered vaned member) is formed to provide a streamlined flow of fluid through the valve. The vanes 39 are, for this purpose, smoothly rounded. This feature enables the diaphragm to be rolled or peeled off the rims of the concentric passages when the valve is opened.

Movement of the diaphragm between the open and closed positions is accomplished by using the pressure of the fluid in a pipe line incorporating the valve. To close the valve the pressure fluid is allowed to pass into the cavity 17 and into the compartment bounded by the diaphragm 6 and the diaphragm-operating compartment casing 13. The equipment necessary for carrying out the above arrangement is a fluid line 21 coupled into the upstream side 9 and valves 22 and 23. Valve 24 allows for the exhaust of fluid to atmosphere while fluid line 25 permits exhausting fluid to be discharged into the downstream side of the valve. It will be seen that the valve is capable of working irrespective of which side is used as the up- and the down-stream sides thereof.

It will be apparent that the member 34 supports the diaphragm against differential pressure on closure, and in this respect it is assisted by the column 35.

I claim:

1. A pressure operated diaphragm valve including a flexible diaphragm dividing the valve into two compartments, the first compartment having a wall portion and being connected to a source of pressure fluid and the second compartment including concentric inner and outer passages, said inner passage having a rim, the diaphragm being movable, as a result of difference in pressure in the first and second compartments, between an open position in which it nests in said wall portion of the first compartment and a closed position in which it rests on said rim of the inner concentric passage, a tapered vaned diaphragm-supporting element located substantially centrally on the side of the diaphragm facing the second compartment and connected to said diaphragm, a column attached to the supporting element and passing through the diaphragm and being slidable in said wall portion of the first compartment, a shoulder on said column and a stop on said wall portion, the shoulder abutting the stop when the diaphragm is in its closed position, the diaphragm-supporting element being dimensioned to fit into the inner concentric passage when the diaphragm is in its closed position to support that area of the diaphragm covering the inner concentric passage against differential pressure between the first compartment and the inner concentric passage, when the inner concentric passage is the outlet.

2. A pressure operated diaphragm valve including a flexible diaphragm dividing the valve into two compartments, the first compartment having a wall portion and being connected to a source of pressure fluid and the second compartment including concentric inner and outer passages, said inner passage having a rim, the diaphragm being movable, as a result of difference in pressure in the first and second compartments, between an open position in which it nests in said wall portion of the first compartment and a closed position in which it rests on said rim of the inner concentric passage, a substantially conical diaphragm-supporting element located substantially centrally on the side of the diaphragm facing the second compartment and connected to said diaphragm, the supporting element being dimensioned to fit into the inner concentric passage when the diaphragm is in its closed position to support that area of the diaphragm covering the inner concentric passage against differential pressure between the first compartment and the inner concentric passage, when the inner concentric passage is the outlet, vanes on the supporting element for the streamlined passage of fluid, a column attached to the supporting element and passing through the diaphragm and being slidable in said wall portion of the first compartment, a shoulder on the column and a stop on said wall portion, the shoulder abutting the stop when the diaphragm is in its closed position.

References Cited in the file of this patent

UNITED STATES PATENTS

| | | |
|---|---|---|
| Re. 19,151 | Saunders | May 1, 1934 |
| 848,739 | Gut | Apr. 2, 1907 |
| 2,180,320 | Hansen | Nov. 14, 1939 |
| 2,200,187 | Nelson | May 7, 1940 |
| 2,677,390 | Davis | May 4, 1954 |
| 2,747,608 | Grove | May 29, 1956 |
| 2,818,880 | Ratelband | Jan. 7, 1958 |
| 2,868,492 | Volcov | Jan. 13, 1959 |
| 2,877,791 | Rich | Mar. 17, 1959 |
| 2,933,257 | Clark | Apr. 19, 1960 |

FOREIGN PATENTS

| | | |
|---|---|---|
| 9,154 | Great Britain | of 1888 |
| 14,189 | Great Britain | June 23, 1904 |
| 590,737 | France | of 1925 |
| 696,545 | Great Britain | of 1953 |
| 727,366 | Great Britain | of 1955 |